United States Patent
Huynh

(10) Patent No.: US 10,592,836 B2
(45) Date of Patent: Mar. 17, 2020

(54) SYSTEM AND METHOD FOR QUEUEING AND PRINTING ELECTRONICALLY FILLABLE FORM PRINT JOBS

(71) Applicants: Kabushiki Kaisha Toshiba, Minato-ku (JP); Toshiba TEC Kabushiki Kaisha, Shinagawa-ku (JP)

(72) Inventor: Phong Huynh, Tustin, CA (US)

(73) Assignees: Kabushiki Kaisha Toshiba, Minato-ku (JP); Toshiba TEC Kabushiki Kaisha, Shinagawa-ku (JP)

(*) Notice: Subject to any disclaimer, the term of this patent is extended or adjusted under 35 U.S.C. 154(b) by 193 days.

(21) Appl. No.: 15/713,050

(22) Filed: Sep. 22, 2017

(65) Prior Publication Data
US 2019/0095838 A1    Mar. 28, 2019

(51) Int. Cl.
  *G06F 3/12*  (2006.01)
  *G06Q 10/10*  (2012.01)
  *G06Q 10/06*  (2012.01)

(52) U.S. Cl.
  CPC ....... *G06Q 10/06316* (2013.01); *G06F 3/126* (2013.01); *G06Q 10/10* (2013.01)

(58) Field of Classification Search
  CPC ...... G06F 3/126; G06F 3/1203; G06F 17/243; G06F 3/1237; G06F 2221/2111; G06F 3/1238; G06F 3/1259; G06F 3/1285; G06F 3/1292
  See application file for complete search history.

(56) References Cited

U.S. PATENT DOCUMENTS

| 4,403,301 A | * | 9/1983 | Fessel | B41J 3/46 358/1.12 |
| 4,466,065 A | * | 8/1984 | Advani | G06F 17/24 710/54 |
| 4,829,468 A | * | 5/1989 | Nonaka | G06F 3/1205 358/1.17 |
| 5,182,705 A | * | 1/1993 | Barr | G06Q 10/06311 705/7.16 |
| 5,327,526 A | * | 7/1994 | Nomura | G06F 3/1296 358/1.15 |
| 5,557,515 A | * | 9/1996 | Abbruzzese | G06Q 10/063114 705/7.15 |

(Continued)

OTHER PUBLICATIONS

PaperCut NG Manual—Release 16.0.2 PaperCut Software International, 2016 (Year: 2016).*

(Continued)

*Primary Examiner* — Scott L Jarrett
(74) *Attorney, Agent, or Firm* — Ulmer & Berne LLP

(57) ABSTRACT

A system and method for storing, distributing, filling and printing of electronic or e-forms includes a memory having a persistent storage that stores fillable electronic document forms. Network communication is made with one or more portable user devices and a printing device. A form request is received from a personal user device. In response, at least one fillable electronic document form is sent to the personal user device via the network interface. One or more filled in electronic forms are received from the personal user device. A queue position is calculated for each received form and this is output to the user. The user is notified when their turn for printing is near and they approach the printer to release a private print of their filled out form.

17 Claims, 5 Drawing Sheets

(56) References Cited

U.S. PATENT DOCUMENTS

| | | | | |
|---|---|---|---|---|
| 5,559,933 A * | 9/1996 | Boswell | G06F 3/1203 | 358/1.15 |
| 5,752,697 A * | 5/1998 | Mandel | B65H 39/10 | 270/58.18 |
| 5,923,826 A * | 7/1999 | Grzenda | H04N 1/00954 | 358/1.15 |
| 5,970,224 A * | 10/1999 | Salgado | H04N 1/00915 | 358/1.14 |
| 6,184,996 B1 * | 2/2001 | Gase | H04L 29/06 | 358/1.15 |
| 6,213,652 B1 * | 4/2001 | Suzuki | G06F 3/1204 | 358/1.15 |
| 6,288,790 B1 * | 9/2001 | Yellepeddy | G06F 3/1204 | 358/1.13 |
| 6,341,907 B1 * | 1/2002 | Katsuyoshi | G06K 15/00 | 358/1.15 |
| 6,493,104 B1 * | 12/2002 | Cromer | G06F 3/1204 | 358/1.15 |
| 6,707,574 B1 * | 3/2004 | Freeman | G06F 3/1204 | 358/1.3 |
| 6,788,429 B1 * | 9/2004 | Clough | G06F 3/1205 | 358/1.14 |
| 6,862,103 B1 * | 3/2005 | Miura | G06Q 10/10 | 358/1.15 |
| 6,980,319 B2 * | 12/2005 | Ohta | H04W 48/00 | 358/1.18 |
| 7,072,059 B2 * | 7/2006 | Van Der Linden | G06Q 10/1053 | 358/1.15 |
| 7,116,436 B2 * | 10/2006 | Lee | G06F 17/243 | 358/1.15 |
| 7,187,462 B2 * | 3/2007 | Oakeson | G06F 3/1212 | 358/1.14 |
| 7,216,347 B1 * | 5/2007 | Harrison | G06F 3/1263 | 358/1.15 |
| 7,646,501 B2 * | 1/2010 | Ikeda | G06F 3/1222 | 358/1.14 |
| 8,446,609 B2 * | 5/2013 | Moriwaki | G03G 15/553 | 358/1.11 |
| 8,482,767 B2 * | 7/2013 | Greene | G06F 3/1288 | 358/1.14 |
| 8,867,081 B2 * | 10/2014 | Soriano | G06K 15/1803 | 358/1.15 |
| 9,164,711 B2 * | 10/2015 | Mori | G06F 3/1206 | |
| 9,213,511 B2 * | 12/2015 | Aida | G06F 3/1213 | |
| 9,229,668 B2 * | 1/2016 | Rhodus | H04M 1/72533 | |
| 9,235,371 B2 * | 1/2016 | Kamath | G06F 3/1222 | |
| 9,250,844 B2 * | 2/2016 | Hiroki | H04N 1/00278 | |
| 9,311,034 B2 * | 4/2016 | Sharpe | G06F 3/126 | |
| 9,329,810 B2 * | 5/2016 | Shustef | H04L 63/0209 | |
| 9,529,560 B2 * | 12/2016 | Abe | G06F 3/1204 | |
| 9,609,515 B2 * | 3/2017 | Tredoux | G06F 21/35 | |
| 9,690,525 B2 * | 6/2017 | Nathani | H04W 4/02 | |
| 10,133,525 B2 * | 11/2018 | Nathani | G06F 3/1222 | |
| 10,216,464 B2 * | 2/2019 | Arora | G06F 21/608 | |
| 2002/0135792 A1 * | 9/2002 | Sommer | G06K 15/00 | 358/1.13 |
| 2002/0171864 A1 * | 11/2002 | Sesek | G06K 15/00 | 358/1.15 |
| 2003/0005097 A1 * | 1/2003 | Barnard | H04L 41/0253 | 709/223 |
| 2003/0048470 A1 * | 3/2003 | Garcia | G06F 3/1204 | 358/1.15 |
| 2003/0103229 A1 * | 6/2003 | Weaver | G06F 21/608 | 358/1.14 |
| 2003/0112306 A1 * | 6/2003 | Simpson | G06F 17/243 | 347/101 |
| 2003/0137690 A1 * | 7/2003 | Hoover | G06F 3/1204 | 358/1.15 |
| 2004/0004735 A1 * | 1/2004 | Oakeson | G06F 3/1212 | 358/1.15 |
| 2004/0105122 A1 * | 6/2004 | Schaeffer | H04N 1/00954 | 358/1.15 |
| 2004/0176117 A1 * | 9/2004 | Strittmatter | H04M 1/7253 | 455/500 |
| 2005/0065894 A1 * | 3/2005 | Inaba | G06K 15/00 | 705/400 |
| 2005/0275875 A1 * | 12/2005 | Jennings, Jr. | G06F 3/1205 | 358/1.15 |
| 2006/0082827 A1 * | 4/2006 | Lee | G06F 3/1204 | 358/1.15 |
| 2006/0244998 A1 * | 11/2006 | Salgado | G06K 15/00 | 358/1.16 |
| 2006/0288269 A1 * | 12/2006 | Oppenlander | G06F 17/243 | 715/207 |
| 2007/0253005 A1 * | 11/2007 | Ola | G06F 3/1207 | 358/1.1 |
| 2009/0021776 A1 * | 1/2009 | Dolan | G06F 3/1222 | 358/1.15 |
| 2009/0240581 A1 * | 9/2009 | Gallo | G06Q 30/02 | 705/14.66 |
| 2010/0091319 A1 * | 4/2010 | Mandel | G06F 3/1204 | 358/1.15 |
| 2010/0149584 A1 * | 6/2010 | Cech | G06F 3/1204 | 358/1.15 |
| 2011/0096354 A1 * | 4/2011 | Liu | G06F 3/1204 | 358/1.15 |
| 2011/0102836 A1 * | 5/2011 | Kawaura | G06F 3/1204 | 358/1.15 |
| 2012/0081744 A1 * | 4/2012 | Kadota | G06F 3/1211 | 358/1.15 |
| 2012/0113458 A1 * | 5/2012 | Benedek | G06F 3/1204 | 358/1.15 |
| 2012/0147420 A1 * | 6/2012 | Nishimi | G06F 3/1204 | 358/1.15 |
| 2012/0188587 A1 * | 7/2012 | Gaertner | G06F 3/1213 | 358/1.15 |
| 2012/0212769 A1 * | 8/2012 | Gaertner | G06F 3/1204 | 358/1.15 |
| 2013/0094045 A1 * | 4/2013 | Nakata | G06F 3/1204 | 358/1.13 |
| 2013/0107324 A1 * | 5/2013 | Kamath | G06F 3/1222 | 358/1.15 |
| 2013/0145420 A1 * | 6/2013 | Ting | H04L 63/08 | 726/1 |
| 2013/0155441 A1 * | 6/2013 | Hong | G06F 3/1222 | 358/1.14 |
| 2013/0163033 A1 * | 6/2013 | Sandler | G06F 3/1208 | 358/1.15 |
| 2014/0368859 A1 * | 12/2014 | Gutnik | G06F 3/1206 | 358/1.14 |
| 2015/0153975 A1 * | 6/2015 | Mori | G06F 3/1206 | 358/1.14 |
| 2015/0242168 A1 * | 8/2015 | Yu | G06F 3/1208 | 358/1.13 |
| 2016/0210087 A1 * | 7/2016 | Amir | G06F 3/1217 | |
| 2017/0109198 A1 * | 4/2017 | Sugimoto | G06F 9/4856 | |
| 2017/0228200 A1 * | 8/2017 | Kessels | G06F 3/1204 | |

OTHER PUBLICATIONS

Pharos Uniprint 8.4—brochure Pharos Systems, 2013 (Year: 2013).*
Printer Manager Plus 2010 Software Asia, Software Shelf International Inc., 2010 (Year: 2010).*
Canon Uniflow brochure Canon, 2012 (Year: 2012).*
Pharos Uniprint 9.0 R2—Pharos Print Center 3.6 Guide Pharos Systems International Inc., Jul. 25, 2017 (Year: 2017).*

* cited by examiner

SYSTEM AND METHOD FOR QUEUEING AND PRINTING ELECTRONICALLY FILLABLE FORM PRINT JOBS

TECHNICAL FIELD

This application relates generally to filling out forms, such as electronically fillable forms. This application relates more particularly to a system and method to automate form distribution, filled form retrieval and print queuing.

BACKGROUND

Paper, fillable forms have been in use for many years providing an expeditious system to secure required information in a structure format. An example of paper forms can be found in a typical setting of a department of motor vehicles (DMV). A DMV provides a variety of services to license vehicles and drivers. Many DMV services start with a requirement that a user fill out information on a printed form corresponding to a desired service. Example service forms include:

Applications for a temporary driver learner permit;
Applications for a driver's license;
Applications for driver license renewal;
Applications for a vehicle license;
Applications for a vehicle license renewal;
Applications to register a vehicle title;
Applications for a replacement vehicle title;
Applications for vehicle instructor license; and
Applications for a chauffeur license Separate forms for the forgoing examples are also needed for different vehicles, such as automobiles, motorcycles or boats. It will be thus appreciated that a service agency such as a DMV, business or school must print and store a myriad of paper forms to cover all needed areas.

In a typical service environment, such as a DMV, a customer waits in line to be waited upon by a staff member. Some establishments may ask a customer to take a paper ticket with a queue number which is called once it is their turn for service. Once called, a user informs a staff member of their needs. The staff member locates a form corresponding to the request and hands it to the customer to fill out, and return it once complete. The customer may once again have to stand in line to return the now-filled form. If a form is incomplete or filled erroneously, the customer would need to fix it before it could be processed, potentially adding ever more waiting time. Only once the form is completed correctly and given to a staff member can the process of completing the requested service commence.

Given the expense in obtaining and maintain MFPs, devices are frequently shared or monitored by users or technicians via a data network. MFPs, while moveable, are generally maintained in a fixed location. Until more recent times, users, which may include individuals or groups such as employees, administrators or technicians administrators of networked MFPs, were also generally in relatively fixed location. A user would typically communicate documents or other information from his or her office or workstation. An administrator or technician would also monitor devices from a workstation.

Users may send document processing jobs, such as a print request, to one or more networked devices. In a typical shared device setting, one or more workstations are connected via a network. When a user wants to print a document, an electronic copy of that document is sent to a document processing device via the network. The user may select a particular device when several are available. The user then walks to the selected device and picks up their job or waits for the printed document to be output. If multiple users send their requests to the same device, the jobs are queued and outputted sequentially.

User devices have become increasingly mobile. Often users interact with MFPs via portable notebook computers, or via handheld devices such as tablet computers, smartphones, or the like. While many portable devices may still be used at a workplace, a user may do so from various workplace locations. Many users will interact with network MFPs while travelling or away from home. While a fixed user in a stable MFP setting may quickly realize an optimal MFP utilization, mobile users, administrators or technicians may not even be aware of what MFP resources are around them.

SUMMARY

In accordance with an example embodiment of the subject application, a system and method for storing, distributing, filling and printing of electronic or e-forms includes a memory having a persistent storage that stores of fillable electronic document forms. Network communication is made with one or more portable user devices and printing device. A form request is received from a personal user device. In response, at least one fillable electronic document form is sent to the personal user device via the network interface. One or more filled in electronic forms are received from the personal user device. A queue position is calculated for each received form and this is output to the user.

BRIEF DESCRIPTION OF THE DRAWINGS

Various embodiments will become better understood with regard to the following description, appended claims and accompanying drawings wherein:

DETAILED DESCRIPTION

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

An improvement to the pre-printed form based service system noted above implements a document processing device. Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFPs are understood to comprise printers, alone or in combination with other of the afore-noted functions. It is further understood that any suitable document processing device can be used.

Today's MFPs include an embedded computer, referred to as a controller and are typically shared in a network environment. MFP can be supplied, either on board or via network storage with access to electronic documents, such as printable forms, that can be selected and printed. In the case of a form based service, a staff member can select and print forms to accommodate a customer on an as-needed basis. Large numbers of pre-printed forms would not have to be stocked and organized. This is particularly advantages for seldom used forms. While this is an improvement, customer queuing delays are still present, along with delays associated with misprinted or erroneously filled paper forms. Also, if one MFP is shared among multiple staff members, there may be a waiting period while earlier print jobs finish before a needed printout can be obtained.

Electronic forms, or e-forms, may be constructed with predefined fields that can be user-fillable on a digital device such as a computer, smartphone, or tablet. Electronic forms can be created, by way of example, with a word processing application, such as Microsoft Word, or with fillable portable document format (PDF) forms created with Adobe Acrobat. Electronic forms can be used in online situations, such as via a web browser. Example embodiments detailed herein provide for a system and method of form selection, distribution, collection and queuing for print which alleviates many of the problems listed above and is particularly advantageous when used in conjunction with form based service centers, such as a BMV.

Figure 1:
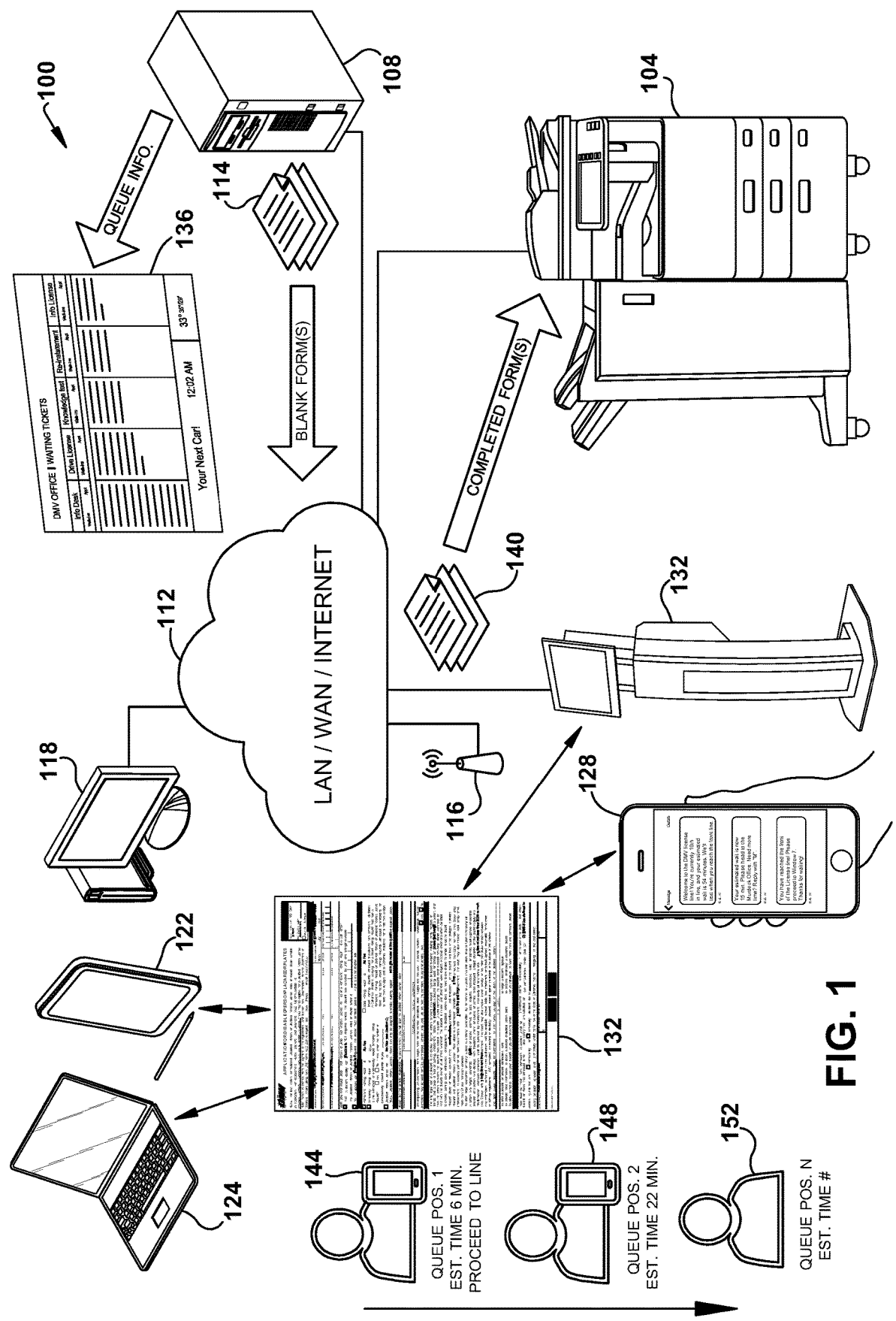
FIG. 1 is an example embodiment of an electronic form based service system.

In accordance with the subject application, FIG. 1 illustrates an example embodiment of an electronic form based service system 100. MFP 104 and server 108 are in data communication via network 112, suitably comprised of a local area network or a wide area network, which may comprise the Internet, or any suitable combination. Network 112 is suitably provides for wired or wireless data communication. Wireless communication is by any suitable wireless protocol, such as via Wi-Fi hotspot 116. Server 108 suitably stores any electronic or e-form that may be of use to a service center. While a DMV is used in the subject example embodiment, it will be appreciated that the embodiments herein are suitably applied to any establishment that uses forms.

Also connected to network 112 is an administrative terminal 118, and one or more digital user devices such as tablet computer 122, notebook computer 124, smartphone 128 or kiosk 132. When a user enters a premises for which one or more filled forms will be required, the user may select and obtain blank forms 114 from server 108, such as DMV form 132 which is obtained and displayed on the user's device for filling electronically. Once completed and verified, as will be detailed below, an completed electronic form 140 is placed in a queue for printing. The print queue can be maintained on any suitable device, such as on server 108 or MFP 104. Each customer, such as customers 144, 148 or 152, is suitably notified of their queue position on their device, or via a publicly viewable display such as display board 136. Users may also be notified of an anticipated waiting time, and may be warned to approach a line or MFP 104 when their printing is imminent. A print job is suitably rendered as a private print job. In such an instance, a user would approach an MFP 104 when their print job is ready to print, and enter a code, biometric or glyph, such as via a touchscreen interface to release their job. This prevents others from potentially access private or sensitive information. A print release can also be made by detection of a device or card associated with a user, such as with a card swipe or a near field communication (NFC) system on their device.

Figure 2:
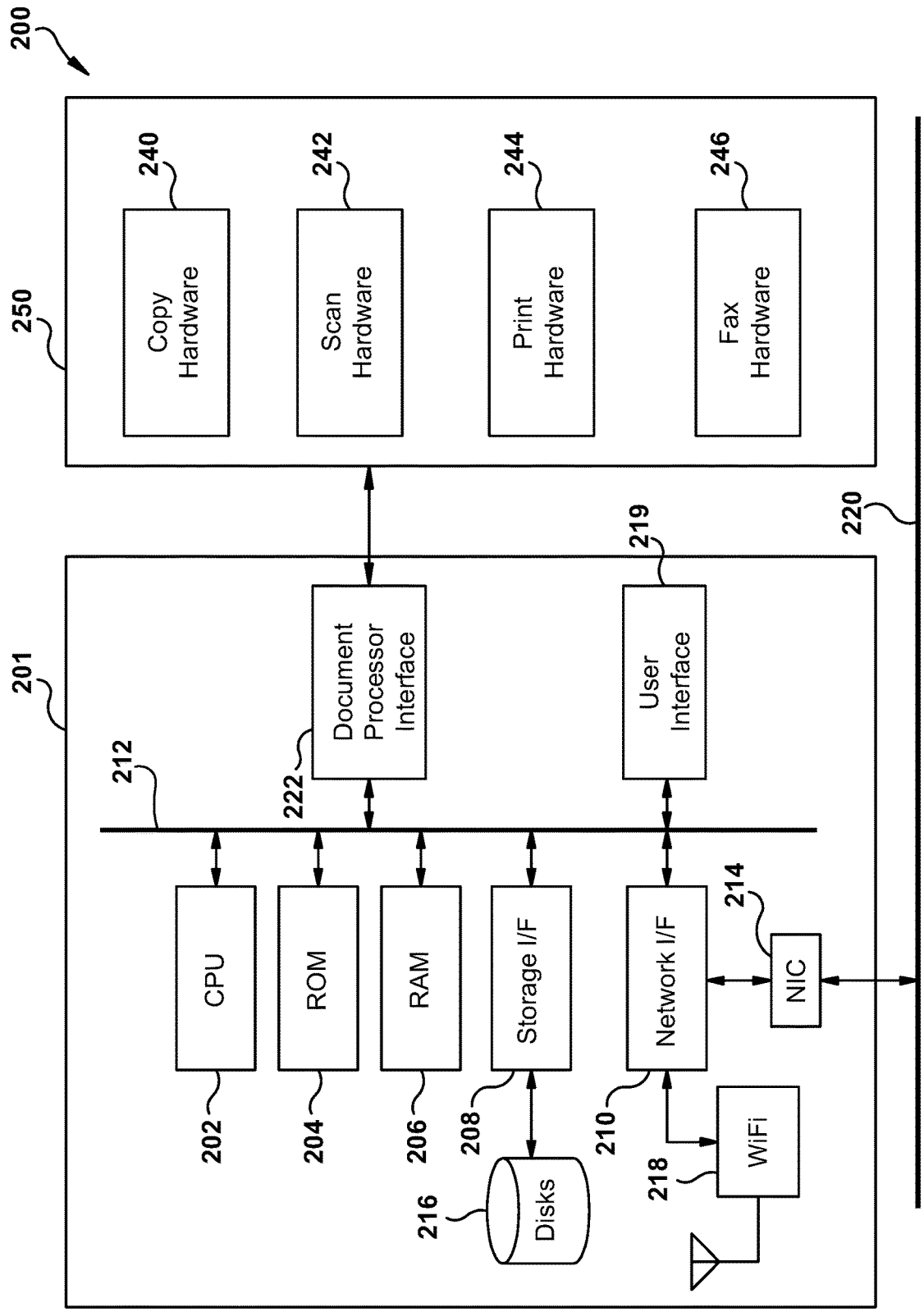
FIG. 2 is an example embodiment of a networked digital device.

Turning now to FIG. 2 illustrated is an example embodiment of a networked digital device comprised of document rendering system 200 suitably comprised within an MFP, such as with MFP 104 of FIG. 1. It will be appreciated that an MFP includes an intelligent controller which is itself a computer system. Thus, and MFP can itself function as a cloud server with the capabilities described herein. Included in controller 201 are one or more processors, such as that illustrated by processor 202. Each processor is suitably associated with non-volatile memory, such as ROM 204, and random access memory (RAM) 206, via a data bus 212.

Processor 202 is also in data communication with a storage interface 208 for reading or writing to a storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired or physical network connection 220, or to a wireless data connection via wireless network interface 218. Example wireless connections include cellular, Wi-Fi, Bluetooth, NFC, wireless universal serial bus (wireless USB), satellite, and the like. Example wired interfaces include Ethernet, USB, IEEE 1394 (FireWire), Lightning, telephone line, or the like. Processor 202 is also in data communication with user interface 219 for interfacing with displays, keyboards, touchscreens, mice, trackballs and the like.

Processor 202 can also be in data communication with any suitable user input/output (I/O) interface 219 which provides data communication with user peripherals, such as displays, keyboards, mice, track balls, touch screens, or the like.

Also in data communication with data bus 212 is a document processor interface 222 suitable for data communication with MFP functional units 250. In the illustrate example, these units include copy hardware 240, scan hardware 242, print hardware 244 and fax hardware 246 which together comprise MFP functional hardware 250. It will be understood that functional units are suitably comprised of intelligent units, including any suitable hardware or software platform.

Controller 201 is suitably provided with an embedded web server system for device configuration and administration. A suitable web interface is comprised of TOPACCESS Controller (sometimes referred to in the subject illustrations as "TA"), available from Toshiba TEC Corporation.

Figure 3:
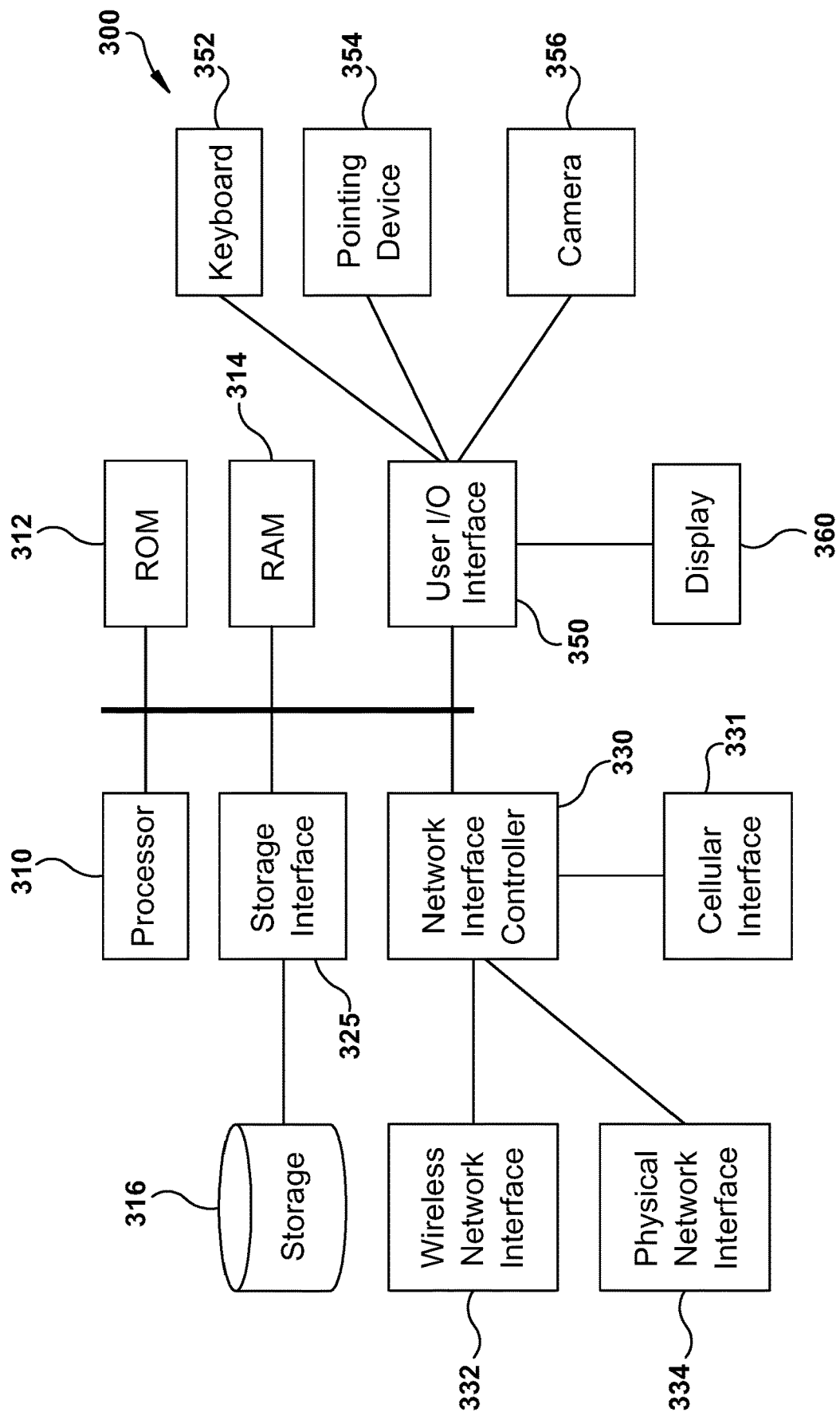
FIG. 3 is an example embodiment of a digital data processing device.

Turning now to FIG. 3, illustrated is an example embodiment of a digital data processing device 300, suitably comprising devices such as administrative terminal 118, tablet computer 122, notebook computer 124, smartphone 128 or kiosk 132 of FIG. 1. Components of the data processing device 300 suitably include one or more processors, illustrated by processor 310, memory, suitably comprised of read-only memory 312 and random access memory 314, and bulk or other non-volatile storage 316, suitable connected via a storage interface 325. A network interface controller 330 suitably provides a gateway for data communication with other devices via wireless network interface 332 and physical network interface 334, as well as a cellular interface 231 such as when the digital device is a cell phone or tablet computer. A user input/output interface 350 suitably provides a gateway to devices such as keyboard 352, pointing device 354, and display 260, suitably comprised of a touch-screen display. It will be understood that the computational platform to realize the system as detailed further below is suitably implemented on any or all of devices as described above. A camera 356 is suitably included such as when the digital device is a camera or tablet computer.

Figure 4:
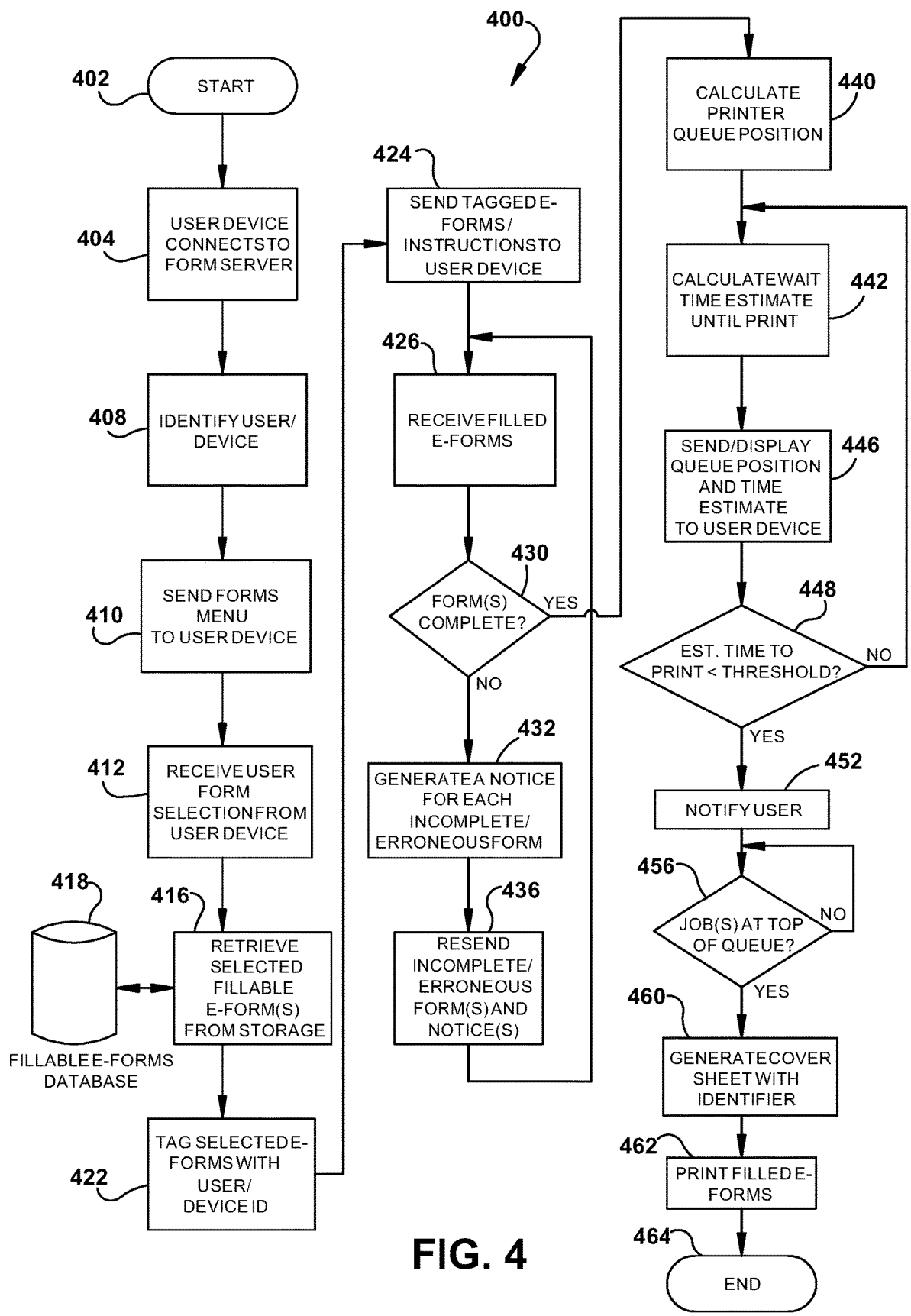
FIG. 4 is an example embodiment of an electronic forms processing system.

FIG. 4 illustrates a flowchart 400 of an example embodiment of an electronic forms processing system. The process commences at block 402 and proceeds to block 404 wherein a user device is connected to a form server. The form server may be a network server, or provided as a function of an MFP controller. A user may login to the form server by supplying an identifier, such as a name, e-mail address, cell phone number, etc. A user is then identified in block 408. A menu of available forms is sent from the server to the user device at block 410, and a user's selection is received at block 412. Corresponding electronic forms are retrieved at block 416 from a fillable e-forms database 418, and retrieved e-forms are suitably tagged at block 422 with a user identifier for later reference. Tagged e-forms are sent to the user at block 424 and filled out e-forms are received at block 426. A check is made at block 430 to determine if one or more returned forms are incomplete or filled out erroneously. If there is a problem, a corresponding notice is generated at block 432 and each affected e-form and corresponding notice is sent to the user at block 436 and a return is made to block 426.

When all received forms are completed satisfactorily as determined by block 430, a printer queue position is calculated at block 440, suitably with a print time estimate at block 442. This information is sent to a user device or displayed on a display panel at block 446. When printing is imminent, suitably determined based on queue time or queue position at block 448, the user is notified at block 452, via message to their device or on a display, so that they may approach or line up for their printout. If printing is not imminent, a queue position or anticipated wait time may be periodically refreshed and sent to the user by a return from block 448 to block 442.

Once a user's job has reached a top of the queue as determined by block 456, a cover sheet, suitably with a job identifier, is generated at block 460 and this cover sheet is printed along with paper copies of the user's filled out e-forms at block 462. As noted above, this is suitably via a private printing function. Once all documents are printed, the process ends at block 464, and the user may proceed to a position for assistance by a staff member.

Figure 5:
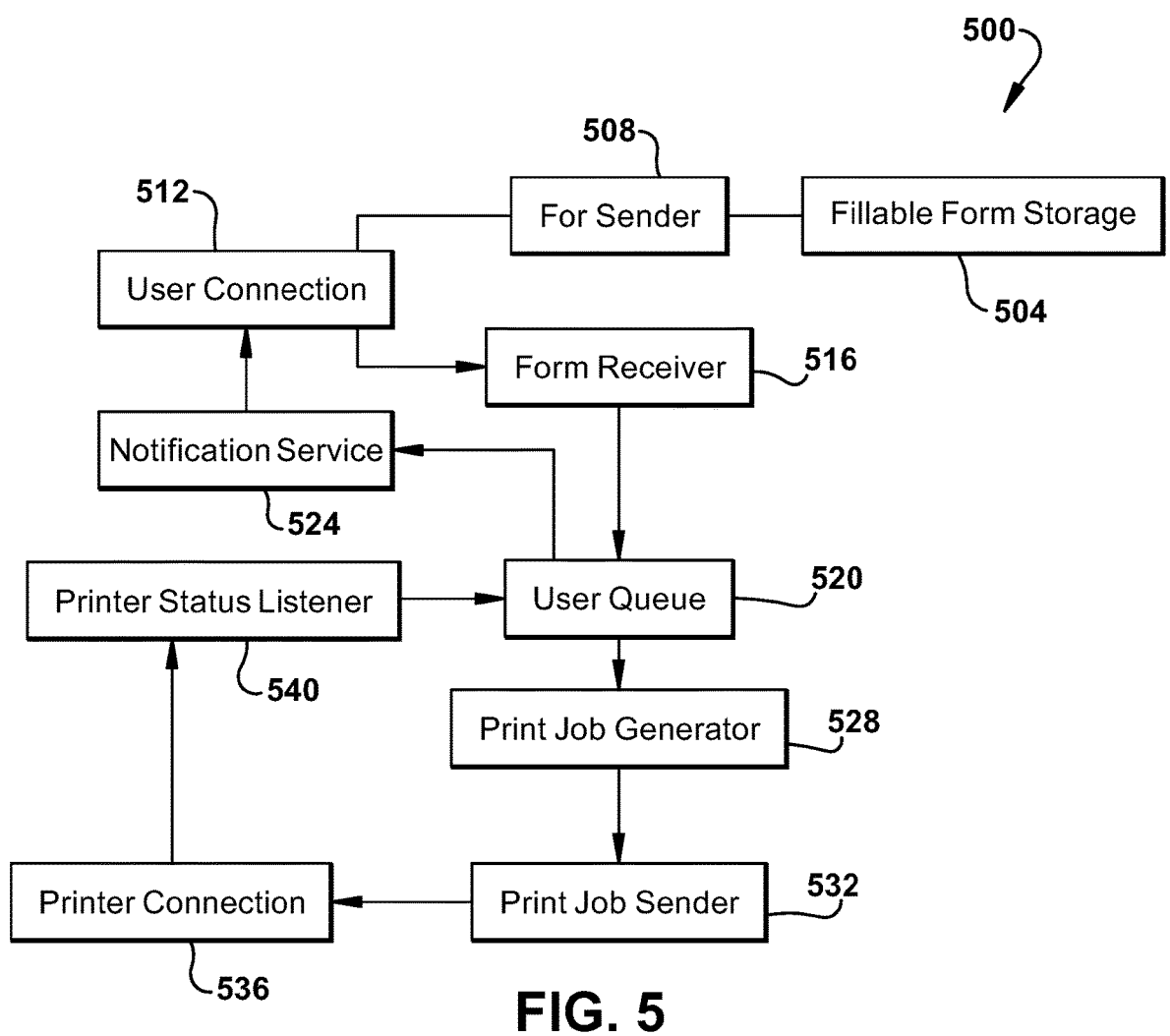
FIG. 5 is a software module block diagram of an example embodiment of an electronic forms processing system.

FIG. 5 illustrates a software module block diagram 500 of an example embodiment of a system for accomplishing e-form processing, suitable for processing on a device such as a server or MFP. Fillable forms are provided in persistent storage via module 504. Module 508 accomplishes form transmission. Module 512 provides for data connection with user devices, and module 516 functions to receive filled forms. Incoming forms are queued by module 520. User notifications are generated by module 524. Printer jobs are generated by module 528 and sent by module 532. Printer connection is accomplished by module 536 and printer status is monitored by module 540

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the spirit and scope of the inventions.

What is claimed is:

1. A device comprising:
    a memory, including a persistent storage, in which a plurality of fillable electronic document forms are stored;
    a network interface configured for data communication with networked data devices including a plurality of portable user devices and at least one printing device; and
    a processor configured to receive a form request from a personal user device via the network interface,
        the processor further configured to send at least one fillable electronic document form corresponding to a received form request from the memory to the personal user device via the network interface,
        the processor further configured to receive, via the network interface, at least one user filled electronic document corresponding to the at least one fillable electronic document form, inclusive of user-supplied information, from the personal user device,
        the processor further configured to generate queue position data corresponding to receipt of the at least one user filled electronic document,
        the processor further configured to output a public display corresponding to the queue position data,
        the processor further configured communicated queue position data to the personal user device generate a private display corresponding to the queue position data on the personal user device,
        the processor further configured to determine when a printout of the at least one user filled electronic document is imminent,
        the processor further configured to generate the queue position data so as to generate a prompt on the personal user device directing an associated device user to approach a printing device when the printout is determined to be imminent, and
        the processor further configured to commence a printout of the at least one user filled electronic document upon receipt of a predefined code, biometric or glyph from the device user.

2. The device of claim 1 wherein the processor is further configured to generate the queue position data in accordance with receipt of at least one additional user filled electronic document from a second personal user device.

3. The device of claim 2 wherein the processor is further configured to periodically generate updated queue position data and communicate the updated queue position data to the personal user device.

4. The device of claim 2 wherein the processor is further configured to periodically generate updated queue position data and communicate the updated queue position data to a queue display screen.

5. The device of claim 2 wherein the processor is further configured to commence a printout of the user filled electronic document when the queue position data indicates that the user filled electronic document is at a top of a queue associated with the queue position data.

6. The device of claim 5 wherein the processor is further configured to output a print notification to the personal user device or a queue display screen.

7. The device of claim 2 wherein the processor is further configured to generate the queue position data in accordance with receipt of a notification of completion of a prior print job corresponding to a user filled electronic document associated with a lower queue position.

8. A method comprising:
storing a plurality of fillable electronic document forms in a persistent storage;
receiving a form request from a personal user device via a network interface;
sending at least one fillable electronic document form corresponding to a received form request from the persistent storage to the personal user device via the network interface;
receiving, via the network interface, at least one user filled electronic document corresponding to the at least one fillable electronic document form, inclusive of user-supplied information, from the personal user device;
generating queue position data corresponding to receipt of the at least one user filled electronic document;
outputting a public display corresponding to the queue position data;
communicating queue position data to the personal user device;
generating a private display corresponding to the queue position data on the personal user device;
determining when a printout of the at least one user filled electronic document is imminent;
generating a prompt on the personal user device directing an associated device user to approach a printing device when the printout is determined to be imminent; and
commencing a printout of the at least one user filled electronic document upon receipt of a predefined code, biometric or glyph from the device user.

9. The method of claim 8 further comprising generating the queue position data in accordance with receipt of at least one additional user filled electronic document from a second personal user device.

10. The method of claim 9 further comprising:
generating periodically updated queue position data; and
communicating the updated queue position data to the personal user device.

11. The method of claim 9 further comprising:
generating periodically updated queue position data; and
communicating the updated queue position data to a queue display screen.

12. The method of claim 9 further comprising commencing a printout of the user filled electronic document when the queue position data indicates that the user filled electronic document is at a top of a queue associated with the queue position data.

13. The method of claim 12 further comprising outputting a print notification to the personal user device or a queue display screen.

14. The method of claim 9 further comprising generating the queue position data in accordance with receipt of a notification of completion of a prior print job corresponding to a user filled electronic document associated with a lower queue position.

15. A multifunction peripheral comprising:
a print engine;
a memory configured to store a plurality of fillable electronic document forms;
a network interface configured for data communication with a plurality of portable user devices; and
an intelligent controller including a processor and associated memory configured to control the print engine,
the processor further configured to receive a form request from an identified personal user device,
the processor further configured to generate an identifier corresponding to the received form request,
the processor further configured to send at least one fillable electronic document form corresponding to the received form request from the memory to the personal user device via the network interface,
the processor further configured to receive, via the network interface, at least one user filled electronic document corresponding to the at least one fillable electronic document form, inclusive of user-supplied information, from the personal user device,
the processor further configured to generate queue position data corresponding to receipt of the at least one user filled electronic document,
the processor further configured to output a public display corresponding to the queue position data,
the processor further configured communicated queue position data to the personal user device generate a private display corresponding to the queue position data on the personal user device,
the processor further configured to determine when a printout of the at least one user filled electronic document is imminent,
the processor further configured to generate the queue position data so as to generate a prompt on the personal user device directing an associated device user to approach a printing device when the printout is determined to be imminent, and
the processor further configured to commence a printout of the at least one user filled electronic document upon receipt of a predefined code, biometric or glyph from the device user.

16. The multifunction peripheral of claim 15 wherein the processor is further configured to generate a cover sheet including indicia corresponding to the identifier.

17. The multifunction peripheral of claim 15 wherein the processor is further configured to engage the print engine to print the at least one user filled electronic document when it reaches a top of the queue.

* * * * *